J. N. WILSON.
GRUBBING PLOW.
APPLICATION FILED JUNE 8, 1918.
1,279,956. Patented Sept. 24, 1918.
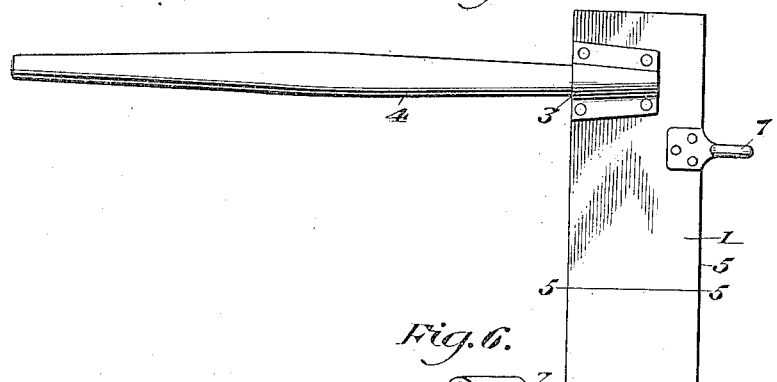
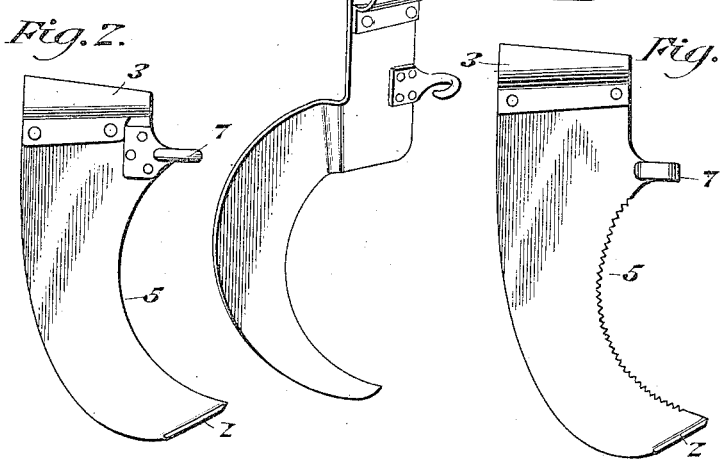
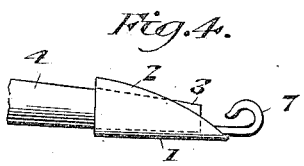
Witnesses
Inventor
J. N. Wilson
By Victor J. Evans
Attorney

UNITED STATES PATENT OFFICE.

JAMES NEAL WILSON, OF MICCO, FLORIDA.

GRUBBING-PLOW.

1,279,956.         Specification of Letters Patent.     Patented Sept. 24, 1918.

Application filed June 8, 1918. Serial No. 238,894.

*To all whom it may concern:*

Be it known that I, JAMES N. WILSON, a citizen of the United States, residing at Micco, in the county of Brevard and State of Florida, have invented new and useful Improvements in Grubbing-Plows, of which the following is a specification.

This invention relates to grubbing plows and it consists in the novel features hereinafter described and claimed.

An object of the invention is to provide a plow of the character stated which is especially adapted to be used for grubbing palmetto and similar roots from the soil.

With this object in view the plow comprises a blade adapted to move under the surface of the soil and provided with a forward cutting edge. The blade is provided at one end with an upstanding flange and at its opposite end with a sleeve adapted to receive the forward portion of a handle. A hook is connected with the forward intermediate portion of the blade and a draft appliance may be connected with the hook whereby a draft animal may be hitched to the blade.

In the accompanying drawing:—

Figure 1 is a top plan view of one form of the plow.

Fig. 2 is a similar view of another form.

Fig. 3 is a similar view of still another form.

Fig. 4 is an end view of the form as shown in Fig. 1.

Fig. 5 is a transverse sectional view of the same cut on the line 5—5 of Fig. 1.

Fig. 6 is a perspective view of still another modified form of the plow.

The grubbing plow comprises a flat blade 1 which is provided at one end with an upstanding flange 2. A sleeve 3 is mounted at the opposite end portion of the blade 1 and is adapted to receive the forward end portion of a handle 4. The blade 1 is provided at its forward portion with a cutting edge 5 and this edge may be straight or curved and the edge may be serrated or provided with teeth as indicated in Fig. 3 of the drawing. A hook 7 is attached to the forward portion of the blade 1 at a point between the sleeve 3 and the inner end of the cutting edge 5 and a draft appliance may be connected with the said hook in the usual manner whereby draft animals may be connected with the plow.

As hereinbefore stated the plow is especially adapted to be used for grubbing palmetto roots from the soil. These roots run along the soil just below the surface and are extremely difficult to grub from the soil. By using the plow hereinbefore described the blade is caused to move under the roots and inasmuch as the blade may be supported at an incline with relation to a horizontal the roots may be lifted from the soil at the rear portion of the blade and in the event that the forward portion of the blade encounters any part of the roots the roots will be severed by the cutting edge 5. Consequently the main or body portion of the roots will be lifted from the soil and deposited upon the surface whereby they will be destroyed by the action of the sun.

The vertically disposed flange 2 may make vertical incisions in the soil or may cut the root provided the flange passes transversely with relation to the root. Thus it is impossible for a root to hang or catch on the blade and drag or pull the same to one side.

From the foregoing description taken in conjunction with the accompanying drawing it will be seen that a grubbing plow of simple and durable structure is provided and that the same may be economically used to advantage for grubbing roots as for instance the roots of palmetto plants.

Having described the invention what is claimed is:—

1. A plow comprising a blade provided at its forward portion with a cutting edge, an upstanding flange located at one end of the blade, a sleeve located at the opposite end portion of the blade and means for connecting a draft appliance with the blade.

2. A plow comprising a blade provided at one end with an upstanding flange, a sleeve mounted on the blade, a handle detachably mounted in the sleeve, a hook carried by the blade, said blade having a cutting edge provided with serrated teeth.

In testimony whereof I affix my signature.

JAMES NEAL WILSON.

Copies of this patent may be obtained for five cents each, by addressing the "Commissioner of Patents, Washington, D. C."